United States Patent Office 3,496,114
Patented Feb. 17, 1970

3,496,114
PROCESS FOR THE PREPARATION OF ALUMINIUM HALOHYDRIDES USEFUL AS CONSTITUENTS OF CATALYTIC SYSTEMS FOR THE STEREOSPECIFIC POLYMERIZATION OF UNSATURATED COMPOUNDS
Paolo Chini and Agostino Baradel, Milan, Italy, assignors to S.N.A.M. S.p.A., a company of Italy
No Drawing. Filed Sept. 20, 1965, Ser. No. 488,740
Claims priority, application Italy, Dec. 30, 1964, 54,926/64, Patent 742,219
Int. Cl. C08f 3/02; C08d 1/32; C08h 1/74
U.S. Cl. 252—429                          3 Claims

ABSTRACT OF THE DISCLOSURE

Aluminum halohydrides for use in catalytic systems for stereospecific polymerization of butadiene, isoprene, etc., are produced by reacting sodium or potassium hydride in a hydrocarbon aromatic solvent with aluminum chloride, bromide, or iodide, in the presence of a Lewis base and in the presence of a catalyst selected from the group consisting of aluminum alkyls, aluminum alkyl hydrides, halogen aluminum alkyls and their complexes with alkali metals, the catalyst having at least two metal to carbon bonds and being present in an amount between 0.5 and 5 mols of compound per 100 mols of the sodium or potassium hydride.

---

This invention relates to a simple and economical process for the preparation of aluminum halohydrides useful as components of catalytic systems for the stereospecific polymerization of unsaturated compounds.

More particularly, the present invention has as its object a process for preparing compounds having the general formula:

$$AlX_mH_n \cdot L_p$$

wherein X is a halogen such as chlorine, bromine or iodine, $m$ and $n$ are integers such that their sum equals 3, L is a Lewis base such as an ether or a tertiary amine, and $p$ can assume any value between 0.3 and 1. The preparation of admixtures of such compounds is also within the scope of the present invention.

It is known, for example, that $AlCl_2H \cdot Et_2O$ can be prepared reacting $LiAlH_4$, or LiH, with $AlCl_3$ in diethyl ether (German Patent No. 893,338), or it can be obtained by causing $NaAlH_4$ to react with $AlCl_3$ in ethereal surroundings (Italian Patent 665,288). Preparation of these substances on an industrial scale according to these methods is adversely affected, however by the fact that the cost of the reactants is high. Another notable shortcoming of these methods lies in need for removal of excess ethyl ether, since it is necessary to do away with this excess, as the presence of ether in the catalytic systems is such as to give rise to distinct disturbances.

As a matter of fact, catalytic systems for low-pressure polymerization of unsaturated compounds, and containing Lewis bases generally have the drawback, whenever the amounts of said bases contained therein are not within certain well defined ranges, of lowering the polymer yields. Furthermore in a few instances, they cause the obtention of polymers having an interlinking which is different from the one desired industrially.

The removal of the ether is performed either by stripping or by evaporation in a thin-film evaporator, generally in the presence of toluene, and involves economic problems, both as far as the evaporated solvent recovery is concerned and as regards the cost of implementation.

It would thus be a notable advantage to be able to prepare halohydrides containing amounts of Lewis bases such as not to jeopardize the polymerization run. On the other hand, according to the known art, the preparation of such halohydrides would be practicable starting from lithium hydride or from complex hydrides of aluminum and alkali metals, which are, as themselves, costly reagents indeed. Moreover, as outlined above, these reagents react only in an ethereal solution, so that halohydrides having a limited ether content can be obtained only by removing the excess thereof; and such a step, all told, has a bearing upon the cost of preparation of said compounds.

We have surprisingly found out that it is possible to obtain compounds having the general formula $$AlH_mX_n \cdot L_p$$

wherein the letters have the meaning as explained in the foregoing, by reacting a sodium or potassium hydride with an aluminum halide, in an inert hydrocarbonaceous medium, in the presence of small amounts of an organometallic compound, by operating at temperatures not above 120° C. and in the presence of the amount of a Lewis base which is necessary for the stabilization of the aluminum halohydride. As the aluminum halide, aluminum chloride, bromide, or iodide can be used, also in their form of etherated complexes.

The inert hydrocarbon medium can be selected among the aromatic ones, benzene, toluene and xylene being those preferably employed.

The organometallic compound can be any compound which contains direct metal-to-carbon bonds. Preferably, aluminum alkyls, aluminum alkyl hydrides, halogen-aluminum alkyls and their complexes with alkali metals, and the like are used, and more particularly those containing at least two direct metal-to-carbon bonds and which are soluble in the reaction medium. By the term "Lewis' bases" the present invention intends to connote, more particularly, the ethers and the tertiary amines whose only function is to stabilize the halohydrides, and thus said bases are employed in amounts which, at the most, are equimolecular with respect to the formed halohydrides. At any rate, to the ends of the practical reaction run, it is wise to operate with a slight excess of said bases, especially when low-boiling compounds, e.g. diethyl ether, are involved: this because it can be forecast that a portion of said complex-forming compound will become lost during progress of the reaction run.

The maximum amount of ether, therefore, should not exceed 1.5 mols per mol of aluminum hydride and such an excess is to be employed only if the reaction is caused to occur at the highest temperatures.

Said bases can either be directly added during progress of the reaction, or can then be fed in a form which is already complexed with aluminum hydride.

The organometallic compound is employed according to a ratio of 0.5 to 5 mols per 100 mols of alkali-metal hydride.

The process according to the present invention is carried out as if either of the following two reaction patterns is followed:

$$mMe^IH + AlHal_3 \cdot L_p \ldots AlH_mX_n \cdot L_p + mMe^IX$$

wherein $Me^I$ is sodium or potassium, X is a halogen, L is a Lewis base and $n=(3-m)$.

The reaction is performed as a single-step process. It is also possible, nevertheless, to cause the reaction to occur in two steps: during the first one, the alkali metal hydride is caused to react with a fraction of the aluminum hydride at a temperature which is higher than the one to be employed for the second step. In the course of the latter step the balance of the halide is added.

The working temperatures, as outlined above, never exceed 120° C. and thus all the temperatures between 0° C. and 120° C. can be adopted, those ranging from 30° C. to 80° C. being preferred.

The hydrocarbonaceous solutions obtained with the process of the present invention can be directly employed together with compounds of transition metals for the polymerization or copolymerization of olefins and diolefins, as disclosed, for example, by the French Patents Nos. 1,314,663, 1,327,965, and 1,333,265 assigned to the assignee of this application.

The following examples are reported better to illustrate the characteristics of this invention and should not be construed in any wise as limitations to the scope thereof.

EXAMPLE 1

5.4 grs. of sodium hydride (0.205 mol) are suspended in 25 mls. of toluene containing 0.45 ml. of AlEt$_3$ (0.003 mol) and, during a period of two hours and at a temperature of 60–65° C., 100 mls. of a toluene solution containing 43.1 grs. of AlCl$_3$.Et$_2$O (0.205 mol) and 3.7 grs. of diethyl ether (0.05 mol) are added thereto. Upon cooling, the reaction mixture is filtered, the residue being washed with toluene. There are obtained 220 mls. of a solution which contains 0.198 gram-atom of Al and 0.396 gram-atom of Cl, corresponding to a yield of 95.0% of theory.

EXAMPLE 2

A four-necked flask equipped with stirrer, reflux condenser, thermometer and a dropping funnel is charged with 7.88 grs. of sodium hydride (0.3 mol), 30 mls. anhydrous toluene and 0.5 ml. AlEt$_3$. The dropping funnel is charged with 100 mls. of a toluene solution containing 56 grs. of AlCl$_3$.Et$_2$O (0.3 mol). The sodium hydride suspension is heated to 80° C. and, during one hour, 25 mls. of the AlCl$_3$.Et$_2$O solution are added dropwise thereto. After one additional hour of stirring at 80° C., the liquid is cooled to 45° C. and, during 1½ hrs. the balance of the AlCl$_3$.Et$_2$O solution is added thereto. The temperature is maintained at 45° C.–50° C. The liquid is filtered and washed with 100 mls. of anhydrous toluene. There are obtained 210 mls. of a clear solution containing 72% of the expected AlCl$_2$H.Et$_2$O. The product contains Cl and Al in a ratio of 2.05 and, when employed as such in the polymerization of butadiene and isoprene gives rise to high conversions into a stereospecific polymer.

EXAMPLE 3

The procedure is very much the same as for Example 2 but, upon completion of the addition of the first 25 mls. of a toluene solution of AlCl$_3$.Et$_2$O, 20 mls. of a mixture toluene-ether, containing all the introduced ether, are distilled off. Upon cooling at 45° C., 0.075 ml. of fresh ether is added. Then, the procedure of Example 2 is followed. A toluene solution, containing 84% of the expected AlCl$_2$H.Et$_2$O, is obtained.

EXAMPLE 4

By carrying out the reaction with an initial ratio of ether to AlCl$_3$ as high as 1.2 and operating as described in Example 2, 90% of the expected AlCl$_2$H.Et$_2$O is obtained. The product contains Cl and Al in a ratio of 1.99 and can be employed as such in the polymerization of butadiene.

EXAMPLE 5

0.3 mol of sodium hydride are suspended in 30 mls. of toluene containing 0.35 ml. of Al(Et)$_3$ and heated to 70° C. During 90 mins. 80 mls. of a toluene solution containing 0.075 mol of AlBr$_3$ are added dropwise. The reaction is exothermic and thus stirring is continued for one additional hour. After cooling at 25° C.–35° C. 35 mls. of anhydrous diethyl ether are added and, thereafter, 100 mls. of a toluene solution containing 0.225 mol of AlBr$_3$. This latter addition takes about 2 hrs. The liquid is filtered, washed with benzene, and a quantitative yield of AlBr$_2$H.Et$_2$O in solution is obtained.

EXAMPLE 6

The procedure is that of Example 4, but the employed catalyst is Al(isobutyl)$_3$ in lieu of Al(ethyl)$_3$, the yield being quantitative.

EXAMPLE 7

To 0.2 mol of sodium hydride suspended in 30 mls. toluene containing 0.002 mol of AlEt$_3$, there are slowly added 67 mls. of a toluene solution containing 0.1 mol of AlCl$_3$.NEt$_3$, one half being added at 80° C. during 2 hrs., the other half being added at 40° C. Upon filtration and washing with toluene, 275 mls. of a clear solution, containing 77.5% of the calculated AlClH$_2$.NEt$_3$, are obtained.

The embodiments of the invention in which an exclusive property or privilege is claimed are defined as follows:

1. A process for the preparation of aluminum halohydrides complexed with a Lewis base and having the formula:

$$AlX_mH_n.L_p$$

where X is a halogen atom selected from the group consisting of chlorine, bromine, and iodine, $m$ and $n$ are integers such that their sum equals 3, L is a Lewis base selected from the group consisting of diethyl ether and triethylamine, and $p$ has a value between 0.3 and 1, comprising
    reacting at a temperature between 0 and 120° C. an alkali metal hydride, selected from the group consisting of sodium and potassium hydrides,
    in a hydrocarbon aromatic solvent,
    with an aluminum halide selected from the group consisting of aluminum chloride, aluminum bromide, and aluminum iodide,
    in the presence of a Lewis base selected from the group consisting of diethyl ether and triethylamine,
    said Lewis base and said aluminum halide being in a molar ratio no higher than 1.5 to 1, and
    in the presence of a catalyst consisting of an organometallic compound of aluminum, selected from the group consisting of aluminum alkyls, aluminum alkyl hydrides, halogen aluminum alkyls, and their complexes with alkali metals, and having at least two metal-to-carbon bonds, and present in an amount between 0.5 and 5 mols of compound per 100 mols of alkali metal hydride.

2. A process according to claim 1, wherein the aluminum halide is first complexed with the Lewis base and is then introduced into the solution containing the alkali metal hydride.

3. A process according to claim 1, wherein the reaction takes place in two stages,
    the first stage being effected between the alkali metal hydride and a portion of the aluminum halide in the presence of the catalyst at a temperature from 50° C. to 80° C., and
    the second stage being effected at a temperature from 40° C. to 50° C., the reaction being completed by adding the balance of aluminum halide.

References Cited

FOREIGN PATENTS 665,288   6/1964   Italy.
893,338   10/1953   Germany.

PATRICK P. GARVIN, Primary Examiner

U.S. Cl. X.R.

23—365; 260—93.7, 94.3